United States Patent
Lowe et al.

(10) Patent No.: US 11,315,002 B2
(45) Date of Patent: *Apr. 26, 2022

(54) TRANSACTION CARD WITH EMBEDDED ELECTRONIC COMPONENTS AND PROCESS FOR MANUFACTURE

(71) Applicant: CompoSecure, LLC, Somerset, NJ (US)

(72) Inventors: Adam Lowe, Somerset, NJ (US); Syeda Hussain, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,096

(22) Filed: Nov. 23, 2020

(65) Prior Publication Data

US 2021/0073607 A1 Mar. 11, 2021

Related U.S. Application Data

(63) Continuation of application No. 16/124,711, filed on Sep. 7, 2018, now Pat. No. 10,885,419.

(Continued)

(51) Int. Cl.
*G06K 19/077* (2006.01)
*G06K 19/06* (2006.01)
*G06K 19/02* (2006.01)

(52) U.S. Cl.
CPC ....... *G06K 19/07722* (2013.01); *G06K 19/02* (2013.01); *G06K 19/06196* (2013.01); *G06K 19/07728* (2013.01); *G06K 19/07747* (2013.01)

(58) Field of Classification Search
CPC ............ G06K 19/07722; G06K 19/02; G06K 19/06196; G06K 19/07728; G06K 19/07747
See application file for complete search history.

(56) References Cited

U.S. PATENT DOCUMENTS 3,802,101 A 4/1974 Scantlin
4,737,620 A 4/1988 Mollet et al.
(Continued)

FOREIGN PATENT DOCUMENTS

CA 2347818 A1 5/2000
CA 2860909 A1 8/2013
(Continued)

OTHER PUBLICATIONS

Chinese Office Action for Chinese Application No. 201780046491.5, dated Jul. 5, 2021 with translation, 16 pages.
(Continued)

*Primary Examiner* — Laura A Gudorf
(74) *Attorney, Agent, or Firm* — RatnerPrestia

(57) ABSTRACT

A process for making a transaction card defined by a plurality of layers is described. The process includes providing a first portion of the card, the first portion comprising a non-plastic layer having first and second faces and a thickness therebetween; forming an opening in the non-plastic layer, the opening defined through the first face; disposing embedded electronics in the opening; providing a second portion of the card; and providing a fill disposed in portions of the opening not occupied by the embedded electronics and attaching the first portion of the card to the second portion of the card.

30 Claims, 8 Drawing Sheets

Related U.S. Application Data

(60) Provisional application No. 62/555,367, filed on Sep. 7, 2017.

(56) References Cited

U.S. PATENT DOCUMENTS

| | | |
|---|---|---|
| 5,013,900 A | 5/1991 | Hoppe |
| 5,350,553 A | 9/1994 | Gläser et al. |
| 5,463,953 A | 11/1995 | Kaspers et al. |
| 5,574,309 A | 11/1996 | Papapietro et al. |
| 5,598,032 A | 1/1997 | Fidalgo |
| 5,681,356 A | 10/1997 | Barak et al. |
| 5,774,339 A | 6/1998 | Ohbuchi et al. |
| 5,835,497 A | 11/1998 | Litzenberger et al. |
| 5,962,840 A | 10/1999 | Haghiri-Tehrani et al. |
| 6,065,681 A | 5/2000 | Trueggelmann |
| 6,188,580 B1 | 2/2001 | Huber et al. |
| 6,817,532 B2 | 11/2004 | Finkelstein |
| D529,955 S | 10/2006 | Allard et al. |
| 7,237,724 B2 | 7/2007 | Singleton |
| 7,701,350 B2 | 4/2010 | Sakama et al. |
| 7,762,470 B2 | 7/2010 | Finn et al. |
| 7,823,777 B2 | 11/2010 | Varga et al. |
| 7,936,273 B2 | 5/2011 | Kobayashi et al. |
| 7,954,228 B2 | 6/2011 | Kobayashi et al. |
| 8,128,000 B2 | 3/2012 | Forster |
| 8,141,786 B2 | 3/2012 | Bhandarkar et al. |
| 8,174,454 B2 | 5/2012 | Mayer |
| 8,226,013 B2 | 7/2012 | Phillips et al. |
| 8,248,240 B2 | 8/2012 | Osaki et al. |
| 8,261,997 B2 | 9/2012 | Gebhart |
| 8,448,872 B2 | 5/2013 | Droz |
| 8,519,905 B2 | 8/2013 | Tanaka et al. |
| 8,608,082 B2 | 12/2013 | Le Garrec et al. |
| 8,622,311 B2 | 1/2014 | Hamedani et al. |
| 8,698,633 B2 | 4/2014 | Kobayashi et al. |
| 8,725,589 B1 | 5/2014 | Skelding et al. |
| 8,786,510 B2 | 7/2014 | Coleman et al. |
| 8,789,762 B2 | 7/2014 | Finn et al. |
| 8,978,987 B2 | 3/2015 | Scarlatella |
| 9,000,619 B2 | 4/2015 | Kato et al. |
| 9,058,547 B2 | 6/2015 | Oh et al. |
| 9,099,789 B1 | 8/2015 | Modro |
| 9,251,458 B2 | 2/2016 | Finn et al. |
| 9,320,186 B2 | 4/2016 | Droz |
| 9,390,363 B1 * | 7/2016 | Herslow ............... B32B 27/08 |
| 9,390,364 B2 | 7/2016 | Finn et al. |
| 9,390,366 B1 | 7/2016 | Herslow et al. |
| 9,475,086 B2 | 10/2016 | Finn et al. |
| 9,489,613 B2 | 11/2016 | Finn et al. |
| 9,622,359 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Herslow et al. |
| D797,188 S | 9/2017 | Hendrick |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,898,699 B2 | 2/2018 | Herslow et al. |
| D812,137 S | 3/2018 | Daniel et al. |
| 10,032,099 B2 | 7/2018 | Mosteller |
| 10,089,570 B2 | 10/2018 | Herslow et al. |
| 10,140,569 B2 | 11/2018 | Kang et al. |
| 10,147,999 B2 | 12/2018 | Wang et al. |
| 10,193,211 B2 | 1/2019 | Finn et al. |
| 10,339,434 B2 | 7/2019 | Cox |
| 10,445,627 B1 | 10/2019 | Sexl et al. |
| 10,583,683 B1 | 3/2020 | Ridenour et al. |
| 10,783,422 B2 | 9/2020 | Herslow et al. |
| 2002/0190132 A1 | 12/2002 | Kayanakis |
| 2003/0028174 A1 | 2/2003 | Chan et al. |
| 2003/0102541 A1 | 6/2003 | Gore et al. |
| 2005/0087609 A1 | 4/2005 | Martin |
| 2006/0102729 A1 | 5/2006 | Gandel et al. |
| 2006/0219776 A1 | 10/2006 | Finn |
| 2006/0226240 A1 | 10/2006 | Singleton |
| 2007/0290048 A1 | 12/2007 | Singleton et al. |
| 2008/0001759 A1 | 1/2008 | Kobayashi et al. |
| 2009/0031954 A1 | 2/2009 | Williams |
| 2011/0024036 A1 | 2/2011 | Benato |
| 2011/0315779 A1 | 12/2011 | Bidin et al. |
| 2012/0044693 A1 | 2/2012 | Hatase et al. |
| 2012/0201994 A1 | 8/2012 | Michalk |
| 2012/0206869 A1 | 8/2012 | Droz |
| 2013/0062875 A1 | 3/2013 | Le Loarer et al. |
| 2013/0102113 A1 | 4/2013 | Yang |
| 2013/0228628 A1 | 9/2013 | Bona et al. |
| 2013/0247432 A1 | 9/2013 | Droz |
| 2013/0255078 A1 | 10/2013 | Cox |
| 2013/0255079 A1 | 10/2013 | Maijala et al. |
| 2013/0299593 A1 | 11/2013 | Glidden, III |
| 2014/0158773 A1 | 6/2014 | Blum |
| 2014/0279555 A1 | 9/2014 | Guillaud |
| 2014/0283978 A1 | 9/2014 | Droz |
| 2014/0361086 A1 | 12/2014 | Finn et al. |
| 2015/0021403 A1 | 1/2015 | Finn et al. |
| 2015/0097040 A1 | 4/2015 | Rampetzreiter et al. |
| 2015/0129665 A1 | 5/2015 | Finn et al. |
| 2015/0136858 A1 | 5/2015 | Finn et al. |
| 2015/0180229 A1 | 6/2015 | Herslow |
| 2015/0206047 A1 | 7/2015 | Herslow et al. |
| 2015/0235063 A1 | 8/2015 | Loussert |
| 2015/0235122 A1 | 8/2015 | Finn et al. |
| 2015/0239202 A1 | 8/2015 | Purdy et al. |
| 2015/0269474 A1 | 9/2015 | Finn et al. |
| 2015/0269477 A1 | 9/2015 | Finn et al. |
| 2015/0278675 A1 | 10/2015 | Finn et al. |
| 2015/0339564 A1 | 11/2015 | Herslow et al. |
| 2016/0110639 A1 | 4/2016 | Finn et al. |
| 2016/0203399 A1 | 7/2016 | Cox |
| 2016/0229081 A1 | 8/2016 | Williams et al. |
| 2016/0365644 A1 | 12/2016 | Finn et al. |
| 2017/0017871 A1 | 1/2017 | Finn et al. |
| 2017/0077589 A1 | 3/2017 | Finn et al. |
| 2017/0106572 A1 | 4/2017 | Cepress et al. |
| 2017/0243104 A1 | 8/2017 | Cox |
| 2017/0262749 A1 | 9/2017 | Cox |
| 2017/0270398 A1 | 9/2017 | Mathieu et al. |
| 2017/0308785 A1 | 10/2017 | Kim et al. |
| 2017/0316300 A1 | 11/2017 | Herslow et al. |
| 2017/0316303 A1 | 11/2017 | Pachler et al. |
| 2017/0323193 A1 | 11/2017 | Kitney et al. |
| 2018/0068212 A1 | 3/2018 | Williams et al. |
| 2018/0157954 A1 | 6/2018 | Herslow et al. |
| 2018/0204105 A1 | 7/2018 | Herslow et al. |
| 2018/0307962 A1 | 10/2018 | Lowe et al. |
| 2018/0339503 A1 | 11/2018 | Finn et al. |
| 2018/0341846 A1 | 11/2018 | Finn et al. |
| 2018/0341847 A1 | 11/2018 | Finn et al. |
| 2018/0349751 A1 | 12/2018 | Herslow et al. |
| 2019/0050706 A1 | 2/2019 | Lowe |
| 2019/0114526 A1 | 4/2019 | Finn et al. |
| 2019/0130242 A1 | 5/2019 | Fu et al. |
| 2019/0156073 A1 | 5/2019 | Finn et al. |
| 2019/0156994 A1 | 5/2019 | Cox |
| 2019/0197381 A1 | 6/2019 | Cox |
| 2019/0204812 A1 | 7/2019 | Cox |
| 2019/0206161 A1 | 7/2019 | Cox |
| 2019/0236434 A1 | 8/2019 | Lowe |
| 2019/0279065 A1 | 9/2019 | Cox |
| 2019/0300695 A1 | 10/2019 | Cox |

FOREIGN PATENT DOCUMENTS

| | | |
|---|---|---|
| CN | 100397406 C | 6/2008 |
| CN | 103153640 A | 6/2013 |
| DE | 19703122 C1 | 5/1998 |
| DE | 19848193 C1 | 11/1999 |
| DE | 19934434 A1 | 2/2001 |
| DE | 10132893 A1 | 1/2003 |
| DE | 102007016777 A1 | 10/2008 |
| DE | 102008053582 B3 | 4/2010 |
| EP | 0277854 A1 | 8/1988 |
| EP | 0426406 A2 | 5/1991 |

(56) References Cited

FOREIGN PATENT DOCUMENTS

| | | |
|---|---|---|
| EP | 2133828 A2 | 12/2009 |
| EP | 2722193 A1 | 4/2014 |
| EP | 2765648 A1 | 8/2014 |
| EP | 3009964 A1 | 4/2016 |
| JP | 61222715 A | 10/1986 |
| JP | 63072596 A | 4/1988 |
| JP | 63185688 A | 8/1988 |
| JP | 63239097 A | 10/1988 |
| JP | 021397 A | 1/1990 |
| JP | 02055198 A | 2/1990 |
| JP | 03205197 A | 9/1991 |
| JP | 0564861 A | 3/1993 |
| JP | 07501758 A | 2/1995 |
| JP | 08276459 A | 10/1996 |
| JP | 09315053 A | 12/1997 |
| JP | 10291392 A | 11/1998 |
| JP | 1111056 A | 1/1999 |
| JP | 2003234615 A | 8/2003 |
| JP | 2004094561 A | 3/2004 |
| JP | 2007021830 A | 2/2007 |
| KR | 20010080890 A | 8/2001 |
| KR | 20140117614 A | 10/2014 |
| KR | 20170061572 A | 6/2017 |
| KR | 20170120524 A | 10/2017 |
| TW | 201723933 A | 7/2017 |
| WO | 9809252 A1 | 3/1998 |
| WO | 2008105582 A1 | 9/2008 |
| WO | 2013110625 A1 | 8/2013 |
| WO | 2015071017 A1 | 5/2015 |
| WO | 2015071086 A1 | 5/2015 |
| WO | 2015144261 A1 | 10/2015 |
| WO | 2016020067 A1 | 2/2016 |
| WO | 2016046184 A1 | 3/2016 |
| WO | 2016073473 A1 | 5/2016 |
| WO | 2017007468 A1 | 1/2017 |
| WO | 2017090891 A1 | 6/2017 |
| WO | 2017177906 A1 | 10/2017 |
| WO | 2018022755 A1 | 2/2018 |
| WO | 2018132404 A1 | 7/2018 |
| WO | 2018138432 A1 | 8/2018 |
| WO | 2018202774 A | 11/2018 |

OTHER PUBLICATIONS

Indian Examination Report for Indian Application No. 202017013311, dated Jul. 8, 2021 with translation, 6 pages.
Non Final Office Action for U.S. Appl. No. 17/101,092, dated Sep. 16, 2021, 54 pages.
Chen et al., "A Metallic RFID Tag Design for Steel-Bar and Wire-Rod Management Application in the Steel Industry", Progress in Electromagnetics Research, PIER 91, 2009, pp. 195-212.
European Communication Pursuant to Article 94(3) for European Application No. 17835207.6, dated Oct. 23, 2020, 6 pages.
Extended European Search Report for European Application No. 17835207.6, dated Mar. 10, 2020, 12 pages.
Final Office Action for U.S. Appl. No. 16/164,322, dated Apr. 11, 2019, 20 pages.
International Preliminary Report on Patentability for International Application No. PCT/US2017/043954, dated Jan. 29, 2019, 6 pages.
International Preliminary Report on Patentability for International Application No. PCT/US2018/049899, dated Mar. 10, 2020, 8 pages.
International Preliminary Report on Patentability for International Application No. PCT/US2018/052832, dated Apr. 21, 2020, 9 pages.
International Search Report and Written Opinion for International Application No. PCT/US2017/043954, dated Oct. 5, 2017, 6 pages.
International Search Report and Written Opinion for International Application No. PCT/US2019/014656, dated Apr. 1, 2019, 16 pages.
International Search Report and Written Opinion for International Application No. PCT/US2019/056704, dated Dec. 18, 2019, 11 pages.
International Search Report and Written Opinion for International Application No. PCT/US2020/034661, dated Sep. 1, 2020, 16 pages.
Japanese Decision of Final Rejection for Japanese Application No. 2019-504037, dated Oct. 6, 2020, with translation, 5 pages.
Japanese Notice of Reasons for Rejection for Japanese Application No. 2019-504037, dated Mar. 10, 2020 with translation, 7 pages.
Korean Office Action for Korean Application No. 10-2019-7005614, dated Apr. 17, 2020, with translation, 14 pages.
Non Final Office Action for U.S. Appl. No. 15/928,813, dated Apr. 15, 2020, 51 pages.
Non Final Office Action for U.S. Appl. No. 16/427,864, dated Nov. 4, 2020, 56 pages.
Non Final Office Action for U.S. Appl. No. 16/441,363, dated Aug. 8, 2019, 23 pages.
Non Final Office Action for U.S. Appl. No. 29/663,230, dated Jul. 25, 2019, 19 pages.
Notice of Allowance for U.S. Appl. No. 14/783,504, dated Nov. 13, 2020, 12 pages.
Third Party Submission Under 37 CFR 1.290, filed in U.S. Appl. No. 15/928,813, Concise Description of Relevance, dated Nov. 11, 2019, 8 pages.
Third Party Submission Under 37 CFR 1.290, filed in U.S. Appl. No. 15/928,813, Concise Description of Relevance, dated Oct. 15, 2019, 13 pages.
Third Party Submission Under 37 CFR 1.290, filed in U.S. Appl. No. 15/928,813, Concise Description of Relevance, dated Oct. 27, 2019, 13 pages.
Entire patent prosecution history of U.S. Appl. No. 16/124,711, filed Sep. 7, 2018, entitled, "Transaction Card With Embedded Electronic Components and Process for Manufacture."
Entire patent prosecution history of U.S. Appl. No. 16/164,322, filed Oct. 18, 2018, entitled, "Overmolded Electronic Components for Transaction Cards and Methods of Making Thereof."
Entire patent prosecution history of U.S. Appl. No. 16/441,363, filed Jun. 14, 2019, entitled, "Overmolded Electronic Components for Transaction Cards and Methods of Making Thereof."
International Search Report and Written Opinion for International Application No. PCT/US2021/013796, dated May 11, 2021, 22 pages.
Notice of Termination of Pretrial Reexamination for Japanese Application No. 2019-504037, dated May 18, 2021 with translation, 2 pages.
Report of Pretrial Reexamination of Japanese Application No. 2019-504037, dated May 12, 2021 with translation, 5 pages.
Japanese Notice of Reasons for Rejection for Japanese Application No. 2020-522026, dated May 25, 2021 with translation, 8 pages.
Canadian Examination Report for Canadian Application No. 3,088,900, dated Apr. 8, 2021, 6 pages.
Non Final Office Action for U.S. Appl. No. 16/320,597, dated Apr. 13, 2021, 74 pages.
International Preliminary Report on Patentability for International Application No. PCT/US2019/056704, dated Apr. 14, 2021, 7 pages.
Australian Examination Report for Australian Application No. 2019213838, dated Jun. 29, 2021, 8 pages.
Japanese Notice of Reasons for Rejection for Japanese Application No. 2020-541522, dated May 31, 2021 translation, 7 pages.
Non Final Office Action for U.S. Appl. No. 17/128,427, dated Jun. 29, 2021, 53 pages.
Singapore Written Opinion for Application No. 11202003431Y, dated Apr. 22, 2021, 7 pages.
Non Final Office Action for U.S. Appl. No. 17/128,427, dated Dec. 15, 2021, 20 pages.
Taiwan Office Action for Taiwan Application No. 109117975, dated Sep. 24, 2021 with translation, 22 pages.
Taiwan Office Action for Taiwan Application No. 110102065, dated Dec. 1, 2021 with Search Report, 12 pages.
Final Office Action for U.S. Appl. No. 17/128,427, dated Oct. 5, 2021, 16 pages.

(56) References Cited

OTHER PUBLICATIONS

Non Final Office Action for U.S. Appl. No. 17/101,092, dated Feb. 17, 2022, 26 pages.

* cited by examiner

TRANSACTION CARD WITH EMBEDDED ELECTRONIC COMPONENTS AND PROCESS FOR MANUFACTURE

CROSS-REFERENCE TO RELATED APPLICATION

This application is a continuation application of U.S. application Ser. No. 16/124,711, filed Sep. 7, 2018, which claims priority to U.S. Provisional Application No. 62/555,367, filed Sep. 7, 2017, the contents of these applications being incorporated by reference herein in their entirety.

BACKGROUND OF THE INVENTION

Users, makers, and issuers of transaction cards may have an interest in embedding electronics into the card as a thin printed circuit board to provide any number of functions. Functionalities provided by such embedded electronics may include, without limitation, functions that permit use of biometrics, one time passcodes, a display (e.g. liquid crystal diode (LCD) or e-ink) for displaying messages or product offerings, an indicator (e.g. a light, such as an LED) that activates when functions of the card are in operation (such as when the card is physically or inductively connected to a reader and being read), connectivity to the internet to permit the card to participate in the Internet of Things (IoT), or any other functionality desired. One illustrative example of a use for embedded electronics in a card is for enabling the use of dynamically generated security codes.

The use of dynamically generated security codes in transaction cards (e.g. smart cards, debit cards, credit cards) is of increasing interest to reduce the risk of fraud, such as is described in U.S. Published Patent App. No. US20140279555A1 (Guillaud), incorporated herein by reference. As described therein and known in the art, exemplary security codes may be referred to by those in the field as the Card Verification Value ("CVV" or "CVV2"), also known as a Card Security Code ("CSC"), Card Verification Data ("CVD"), Card Verification Value Code ("CVVC"), Card Verification Code ("CVC" or "CVC2"), Verification Code ("V-code" or "V code"), or Card Code Verification ("CCV").

Guillaud also discloses exemplary electronic components that may be used to implement the generation of a dynamic security codes in a card 200, including a processor/controller 202, battery or other power source 204, memory 206, and a display 208, as illustrated herein in FIG. 2. Additional components may include, for example, one or more antennas 210, one or more other user interfaces, such as a touch keypad 212 or a touch sensitive control button 214 connected to the processor/controller, and an internal clock (not shown) embedded in, or configured to provide a time input to, the processor/controller.

Cards with dynamically generated codes generally require the electronic display and other embedded electronic components not only to provide the functionality needed, but also to be extraordinarily thin, so as to fit within the thickness of a standard credit card, which is typically about 0.030+/−0.003 inches (i.e. 1/32 of an inch, 30 mils, or 0.76 millimeters+/−10%). Guillaud, as well as the disclosures of U. S. Published Patent App. No. US20120206869A1 and U.S. Pat. Nos. 8,448,872 and 9,320,186, all of which are also incorporated herein by reference, describe plastic cards with embedded electronic components and/or processes for their manufacture. There is an interest in the field, however, for providing embedded electronics, such as electronic components for facilitating the use of dynamic security codes, in cards constructed from materials other than plastic, such as metal or ceramic, which constructions present unique manufacturing challenges.

SUMMARY OF THE INVENTION

One aspect of the invention comprises a transaction card having a non-plastic core, such as metal or ceramic, having first and second faces, a pocket defined by an opening in the first face, a void, and a pocket bottom. The non-plastic core could also be a non-plastic polymer, for example, as plastic is a specific type of polymer. Embedded electronics, comprising at least a printed circuit board and a power source, are disposed in the void, with an EMI shielding layer, such as ferrite, disposed between the electronics and the bottom of the pocket for a card with a metal core). The printed circuit board may be a flexible circuit board, for example. The power source does not necessarily require a battery, and may be RF power, for example. A cured resin layer is disposed in contact with the first face and the embedded electronics, and in portions of the void not occupied by the embedded electronics, and one or more layers are disposed over the cured resin layer. The one or more layers may comprise a clear plastic layer, a magnetic stripe and a laser reactive layer. For each embodiment, each of the one or more layers could comprise a layer of glass or fiber reinforced epoxy laminate sheet material. In some embodiments, the embedded electronics may further include a display and a processor configured to generate a dynamic security code on the display. A through-hole in the core that connects the second face to the bottom of the pocket may be provided, with contacts disposed in the through-hole configured to be read by a card reader, and an integrated circuit module connected to the contacts. The core may have a coating on the second face and printed indicia on the coating. Indicia may also be formed on at least one of the one or more layers disposed over the cured resin layer, such as printed indicia, laser formed indicia, or a combination thereof.

Another aspect of the invention comprises a process for making a transaction card defined by a plurality of layers defining a first portion and second portion. The process comprises providing the first portion of the card comprising the core, forming the pocket in the core, and disposing the embedded electronics in the void. A first component of a resin is applied to the first portion of the card in contact with the first face and the embedded electronics and disposed in portions of the void not occupied by the embedded electronics, and a second component of the resin is applied in contact with a second portion of the card. The first component and second component are assembled together with the first component of the resin and the second component of the resin in contact with one another, and the resin is cured. The resin may comprise, for example, a two part epoxy in which the first component of the resin is different from the second component of the resin. The resin is not limited to a two-part epoxy, however, and in other embodiments may include, for example, a one part epoxy, heat cured epoxy, UV cured epoxy, anaerobic epoxy, and the like, without limitation. The step of curing the resin may comprise curing the resin at room temperature in a vacuum press. The step of curing may involve UV based curing, humidity based curing or temperature based curing, for example. The second portion may have a plurality of layers, in which case the process may include pre-laminating the plurality of layers together prior to applying the resin. In an embodiment in which the core comprises metal, the process further comprises disposing a layer of ferrite between the embedded electronics and the pocket bottom.

Alternatively, in one aspect of the invention, before applying the two-part epoxy, a resin may first be delivered into the opening of the first portion of the card and in contact with the embedded electronics. Once the resin is cured, the two part epoxy may be applied to the first and second portions of the card, as described above.

The process may include printing indicia on a coating on the second face of the core as well as forming indicia on one or more layers of the second portion, such as printing the indicia on a clear plastic layer or creating laser-formed indicia by exposing a laser reactive layer to a laser. The process may further include forming a through-hole in the first portion connecting the second face to the bottom of the pocket, disposing contacts in the through-hole, and electrically connecting the contacts to an integrated circuit module. The plurality of layers of the second portion may include a carrier substrate having one adhesive side and one non-adhesive side, a clear plastic layer, a magnetic stripe, and a laser reactive layer, in which case pre-laminating the second portion may include contacting the adhesive side of the carrier substrate to one side of the clear plastic layer and laminating the laser reactive layer to the clear plastic layer.

The process may comprise assembling the plurality of layers that define the card as a composite comprising a plurality of sheets, each sheet defining one of the plurality of layers and having an area larger more than twice as large as the area of a single card, in which case the process includes cutting a plurality of individual transaction cards from the composite. The individual transaction cards may then be personalized after cutting the card from the composite.

Another aspect of the invention comprises a transaction card including a non-plastic core having first and second faces, a core thickness therebetween, and an opening. Embedded electronics are disposed in the opening. The embedded electronics include indicators, which may be an LED or a display. One or more layers are disposed over the non-plastic core and the embedded electronics. The one or more layers may be either transparent or include openings such that the display is visible from an exterior of the transaction card.

DETAILED DESCRIPTION OF THE INVENTION

Figure 1A:
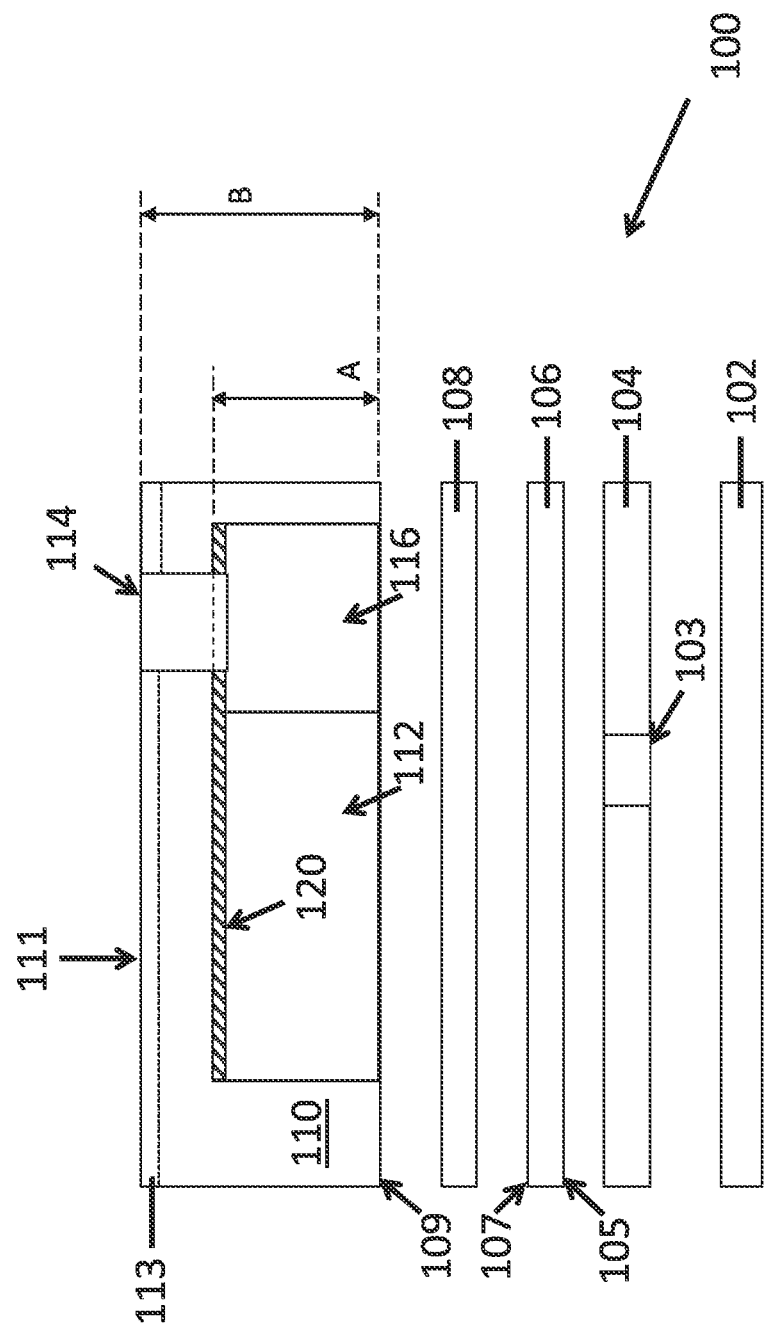
FIG. 1A is a schematic illustration of an exemplary card in accordance with an embodiment of the invention.

Referring now to FIG. 1, there is shown one exemplary embodiment of the invention. In this example, card 100 comprises what is sometimes referred to as a "metal veneer card." Card 100 comprises a plurality of layers, and may include additional layers other than those depicted herein. Layer 110 comprises a metal core, such as comprising stainless steel, having a top surface 111 and a back surface 109. Metal core 110 may have a coating 113 that forms front surface 111 for supporting printing thereof.

Coating 113 may comprise, for example, a polyester based coating that is receptive to UV curable screen and inkjet inks. A resist may be applied over this coating during any acid etching steps (such as if an etching step is used for creating any of the pockets as described herein later). For example, the resist is applied to the entire coated side 111 of the metal while the other side 109 is etched, and the etched side 109 receives the resist except where pocket 112 (and any other pockets or surface patterns) is to be formed. After etching, the remaining resist is removed from both sides and the part is ready for further manufacturing.

Layer 108 of epoxy abuts the bottom surface of the metal core and may also completely or partially fill pocket 112. Layer 106 comprises a layer of adhesive film, such as a clear polyester-base film having an adhesive, such as a copolymer adhesive, such as but not limited to an ethylene acrylic acid (EEA) adhesive, on both sides 105 and 107. The invention is not limited to any type of adhesive or carrier substrate for that adhesive, however. Layer 104 may be a polymer or plastic layer, such as for example a clear amorphous copolyester film, such as Tritan™ film (made by Eastman Chemical) having a window 103 formed therein, and layer 102 may be a laser reactive layer, such as laser reactive PVC, on which a magnetic stripe overlay may also be disposed. The window 103 could be either cut out or punched out of the layer 104 during printing. In one exemplary embodiment, the metal core layer may have a thickness of 0.025 inches (0.635 mm), and each of the epoxy 108, adhesive layer 106, plastic layer 104, and laser-reactive 102 layers may have thicknesses of 0.002 inches (0.05 mm). The invention is not limited to any particular dimensions, although the resulting product typically is of a thickness that meets the standard thickness for transaction cards known in the art. The invention is also not limited to any particular materials of construction for the layers, or the number of layers described in this example.

Figure 3:
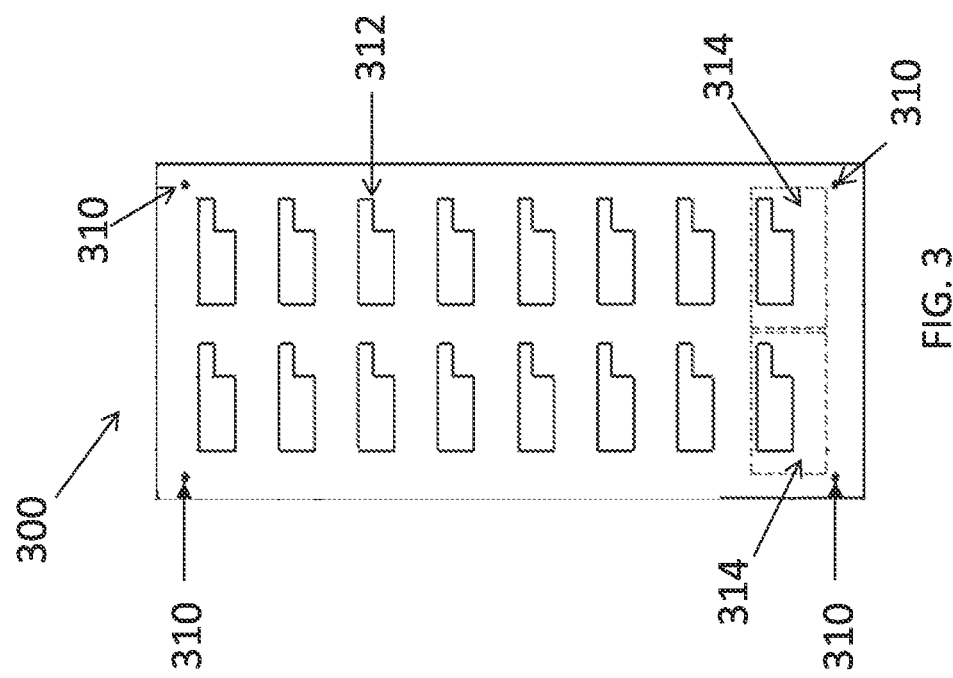
FIG. 3 is a schematic diagram of an exemplary manufacturing process in accordance with an embodiment of the invention.

In an exemplary process for manufacturing the cards, card blanks are created from a sheet having an area sufficiently large to permit a plurality of cards to be cut from the same sheet. For example, a sheet that is approximately 8" wide by 20" long, such as sheet 300 depicted in FIG. 3, may support the creation of sixteen card blanks 314 in rows and columns two cards wide by eight cards tall. It should therefore be understood that although depicted as a sheet in FIG. 3 and as individual cards in FIG. 1, the sheet of FIG. 3 may contain all of the layers of FIG. 1 prior to cutting the sheet into individual card blanks.

In a first operation of an exemplary manufacturing process, four registration holes 310 are created in sheet 300. Then, sixteen pockets are formed in the back side of the sheet, such as by etching, engraving, milling, or by any method known in the art, including using a standard CNC program. As depicted in FIG. 1, the pockets may penetrate only to a depth A, which is less than the thickness B of the card by an amount sufficient to avoid pocket deformation of the card. For example, in an embodiment in which the card thickness is approximately 0.025 inches (0.635 mm) (dimension "B" as shown in FIG. 1, the depth of the pocket (dimension "A" as shown in FIG. 1) may be only 0.019 inches (0.48 mm). The invention is not limited to any particular dimensions, however.

Figure 4A:
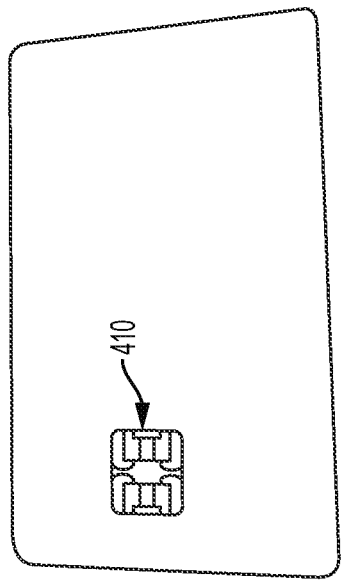
FIG. 4A and FIG. 4B illustrate the front and back sides, respectively, of an exemplary card in accordance with an embodiment of the invention.

Pockets 112 as shown have a relatively wider region 112 and a relatively narrower region 116, and may have a through hole 114. Through hole may be permitted in the pocket for aligning a display to be visualized from the front of the card or for insertion of a payment module, comprising an integrated circuit (not shown) and contacts 410 (depicted in FIG. 4A) for use in a card configured to be read by a contact card reader. In some embodiments, the through-hole for the chip and contacts 410 (and other aspects of the payment module) may not coincide with the pocket for embedding the PCB. The through hole for the payment module may be separate from pocket 112, including being immediately adjacent to pocket 112 such that through hole 114 and pocket 112 share a boundary, or being spaced from pocket 112 with a portion of the core layer between. In other embodiments, the contacts and IC module may be inserted in a pocket that does not fully penetrate the card, which pocket is open from the front of the card, which pocket may not spatially overlap with pocket 112 at all, or may only partially overlap. The contacts 410 may be part of a contacts-only system or part of a dual interface (DI) system configured to be operated by either a contact card reader or an inductive (contactless) card reader. The relatively wider region 112 may be configured for receiving a display and a processor for operating the display, whereas the narrower region 116 may be configured for receiving an integrated circuit chip module, contacts, and any antenna(s) associated with a DI system. Through hole 114 may be created in narrower region during or immediately after the pocket etching step, or it may be performed later.

Printed matter may then be printed on the front (coated) side 111 of the cards, such as with an inkjet printer, or using any other printing technique known in the art.

An electromagnetic interference (EMI) shielding layer insert 120, such as a ferrite layer, is prepared having the same geometry as the inside of the pocket 312, such as by cutting the insert from a sheet of ferrite comprising a layer of ferrite material disposed on one side of a plastic film (such as PET). The ferrite insert 120 is then picked and placed, such as manually or robotically, and the uncoated side of the ferrite film is affixed in the pocket with an adhesive. Alternatively, the ferrite insert 120 may be bonded to an inlay or PCB (such as PCB 426) rather than the pocket 112. Regardless, the ferrite insert 120 is generally positioned between the pocket bottom and the electronic components 420.

Figure 4B:
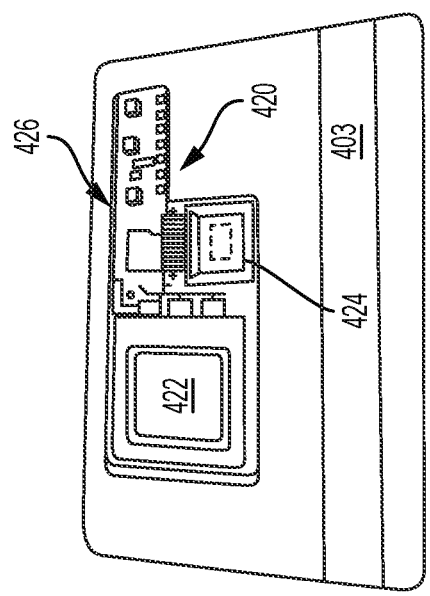

In one embodiment, a carrier substrate may have ferrite disposed on one face of the substrate and adhesive on the other face, along with a release layer that is removed to expose the adhesive before insertion. The electronic components 420, such as those shown in FIG. 4B and described herein later, such as a PCB 426 printed on a substrate and connected display 424 (such as an e-ink display, which requires very low power to operate) and power source 422, are then placed on top of the ferrite insert. The electronic components may be tacked in place. Tacking, as described herein in various embodiments, may be accomplished with any adhesive known in the art, such as but not limited to a pressure sensitive adhesive, cyanoacrylate or epoxy.

Figure 2:
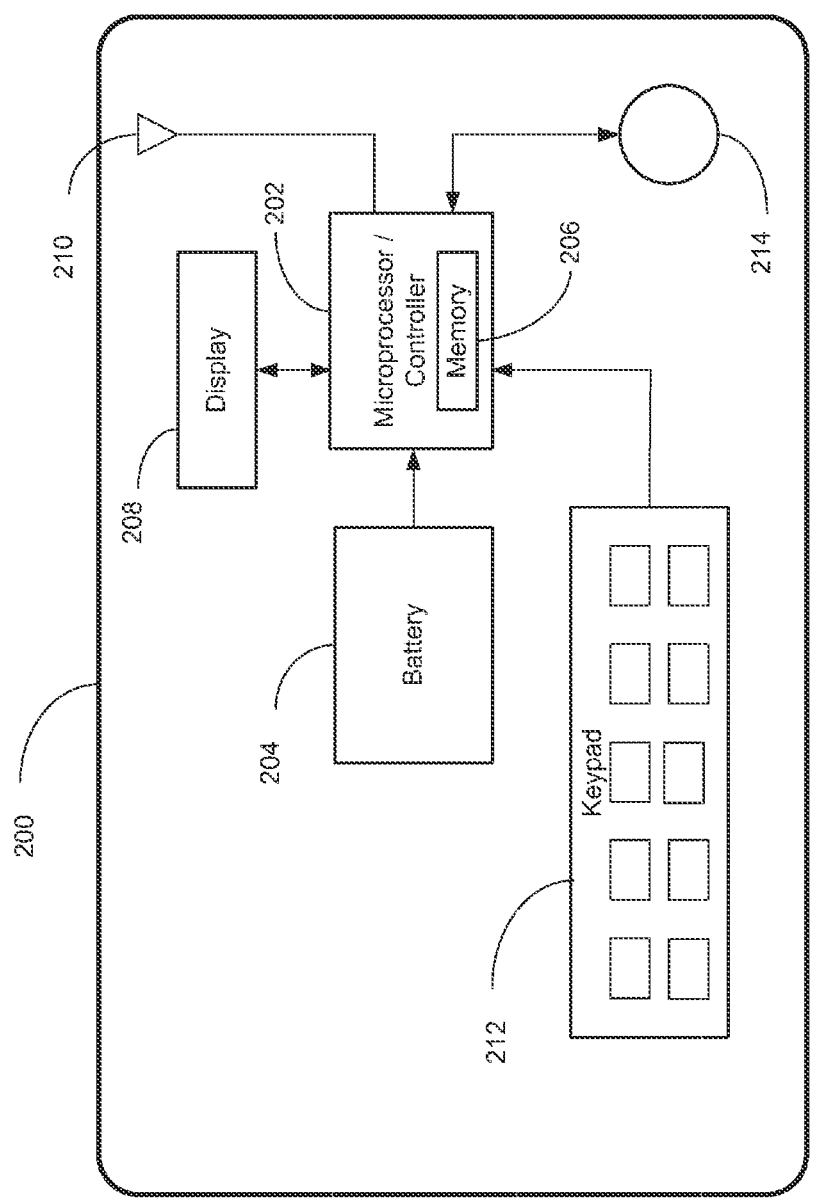
FIG. 2 is a schematic diagram of embedded electronics that may be found in a transaction card to provide dynamic security code functionality.

Electronic components 420 may comprise all, fewer than all, or entirely different components than those schematically illustrated in FIG. 2, depending on the functionality desired for the card. For example, the components may include a keypad for entry of information. Notable, the disposition of the components as shown in FIG. 4 are only exemplary, and for example, instead of display 424 facing the back of the card, the card may have a through-hole, and the display may be disposed to face the front of the card. Power source 422 may comprise a battery or any other source of power suitable for including in a card, such as a photovoltaic cell, or a circuit (e.g. comprising capacitor relays) that harvests electricity from radio frequency (RF) signals, as are known in the art. Methods for making PCBs suitable for insertion in a card body, including PCBs comprising flexible substrates, are well known in the art and the invention is not limited to any particular type of PCB, or to any particular type of functionality of the PCB (nor to any particular functionality of the other electronic components). The materials of the EMI shielding layer are not limited to ferrite materials, and the insert may comprise any materials suitable for providing shielding of the electronic components and antenna(e) from detrimental interference posed by a metal core. Furthermore, although efficiently inserted by cutting an insert from a sheet of ferrite-containing material and disposing it in the pocket, in other embodiments, the EMI shielding layer may be provided in some other manner, such as by coating the active ingredient to the pocket bottom.

Adhesive layer 106 and plastic layer 104, which may have a window 103, which window may be a hole cut in the layer or a transparent or translucent portion that is, for example left unprinted or other uncolored, or has a coloration through which the underlying display may be suitable read, may be prelaminated to one another, and printed matter may be printed on the plastic side of the prelaminate thus formed. The adhesive side 105 of the adhesive film may have a release layer on it to protect it from contamination due to handling prior to coupling the adhesive side to the plastic layer before the prelamination step. In some embodiments, plastic layer may comprise a layer that has a primer or otherwise comprises a material suitable for adhering directly to resin layer 108.

The 104/105/106 prelaminated composite is then laminated to the laser reactive layer PVC. A magnetic stripe (403 depicted in FIG. 4B) may be provided, such as disposed as an overlay on the laser reactive layer, with the combined laser reactive layer/magnetic stripe composite covered with a release (not shown), prior to making the combination with the prelaminated composite. Although depicted in FIG. 4B as disposed in a location that does not intersect the embedded electronics, the magnetic stripe may be disposed over portions of the electronics.

Epoxy, such as a two-component clear epoxy resin system, is then applied, such as by screen printing, with one component applied to the back side 109 of the metal layer (thereby encapsulating the electronics in the pocket) and the other component applied to the non-adhesive side 107 of the 104/105/106 prelaminated composite, and the two epoxy-coated sides are assembled in contact with one another. An absence of air gaps/voids at the epoxy interface is important to maintaining good peel strength after combination. The assembly is then laminated, such as via a cold laminating process using a vacuum press, which may help to remove the air gaps/voids. The laminating and curing cycle of the epoxy may have a significant impact on the adhesion/peel strength of the card. Although not limited to any particular lamination conditions, cold lamination curing of a 20-3401 epoxy at a pressure of approximately 15 PSI at room temperature (e.g. 75-78 degrees F.) for a duration of about 22 to 24 hours has been demonstrated to be create a card that passes the CQM 13.2.1.22/TM-412 Peel Strength test using a 90 degree Peel Adhesion Test an ADMET® Single Column Adhesive and Peel Testing System.

After 48 hours of further curing of the epoxy after removal from the vacuum press, the contacts 410 of the connected chip module may then be inserted in the through hole or pocket designated for housing the chip module (which hole or pocket may be created prior to the assembly of the core to the other layers, or after creation of that assembly at any time prior to placement of the chip module). As previously noted, the through hole or pocket for receiving the payment module comprising the contacts 410, may be located inside the pocket 112, adjacent the pocket and having a common boundary with the pocket, or may be a discrete hole separated spaced apart from the pocket. The individual card blanks 314 are then cut from sheet 300. The card blanks are then ready for cleaning, inspection, and any further processing, including personalization. The personalization step, as is known in the art, may include the step of exposing the laser reactive layer to a laser to form, for example a laser-formed signature personalized to a holder of the card, and programming the embedded electronics with information assigned to the card holder. For example, in an embodiment with an integrated circuit module and contacts readable by a card reader (or dual interface module configured for contactless reading), the chip may be programmed with information unique to the card holder, as is well known in the art. The processor and/or memory associated with functional components for displaying the security code may also be provided with information unique to the card holder as part of the personalization step.

Figure 1B:
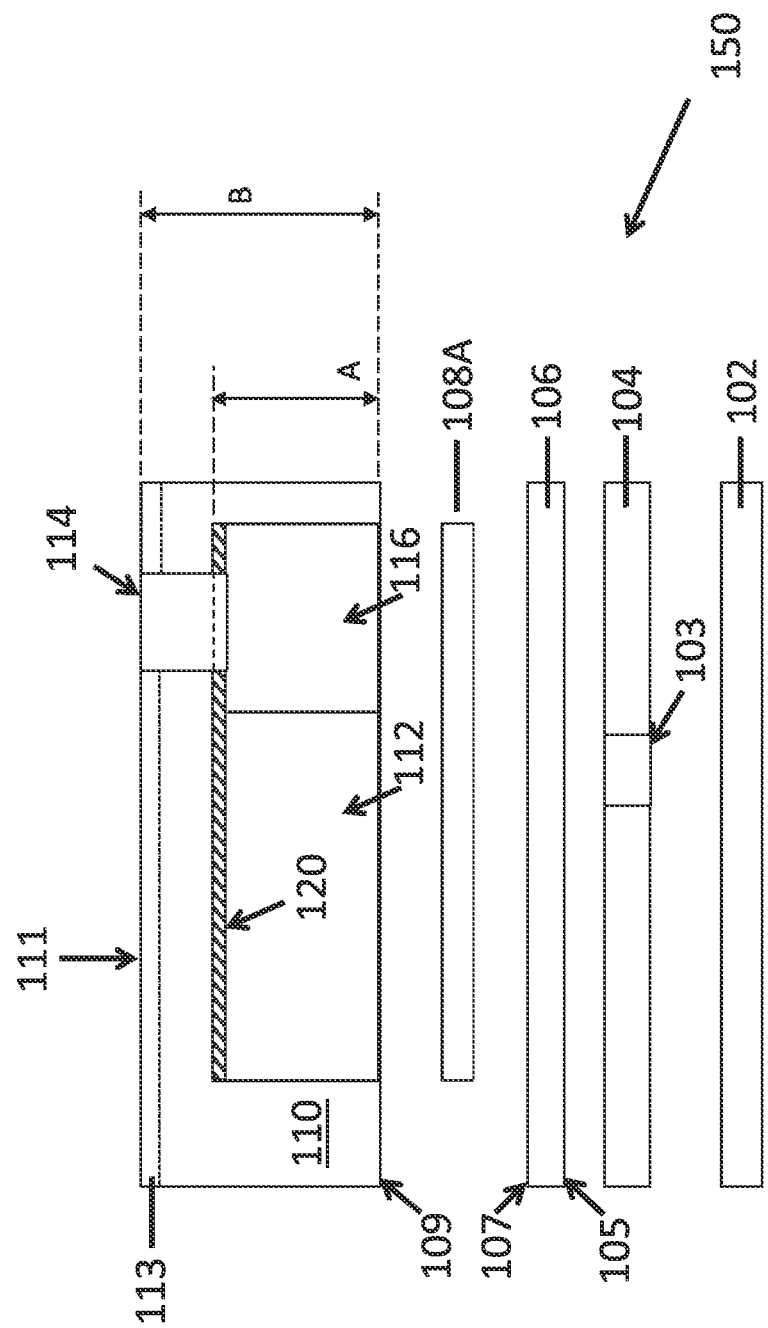
FIG. 1B is a schematic illustration of an exemplary card in accordance with an embodiment of the invention in which a fill layer is confined to the pocket.

In another exemplary process of making a card 150, illustrated in FIG. 1B, electronics may be tacked (such as with adhesive) into pocket 112, then pocket 112 may be filled with epoxy 108A (without covering surface 109 of layer 111), and then the one or more additional sheets may "cold" laminated (i.e. at room temperature, as described above) to the back surface 109 of the card. Thus, as shown in FIG. 1B, epoxy 108 may not be coextensive with the length of the card, but rather may be confined to the pocket 112.

Figure 1C:
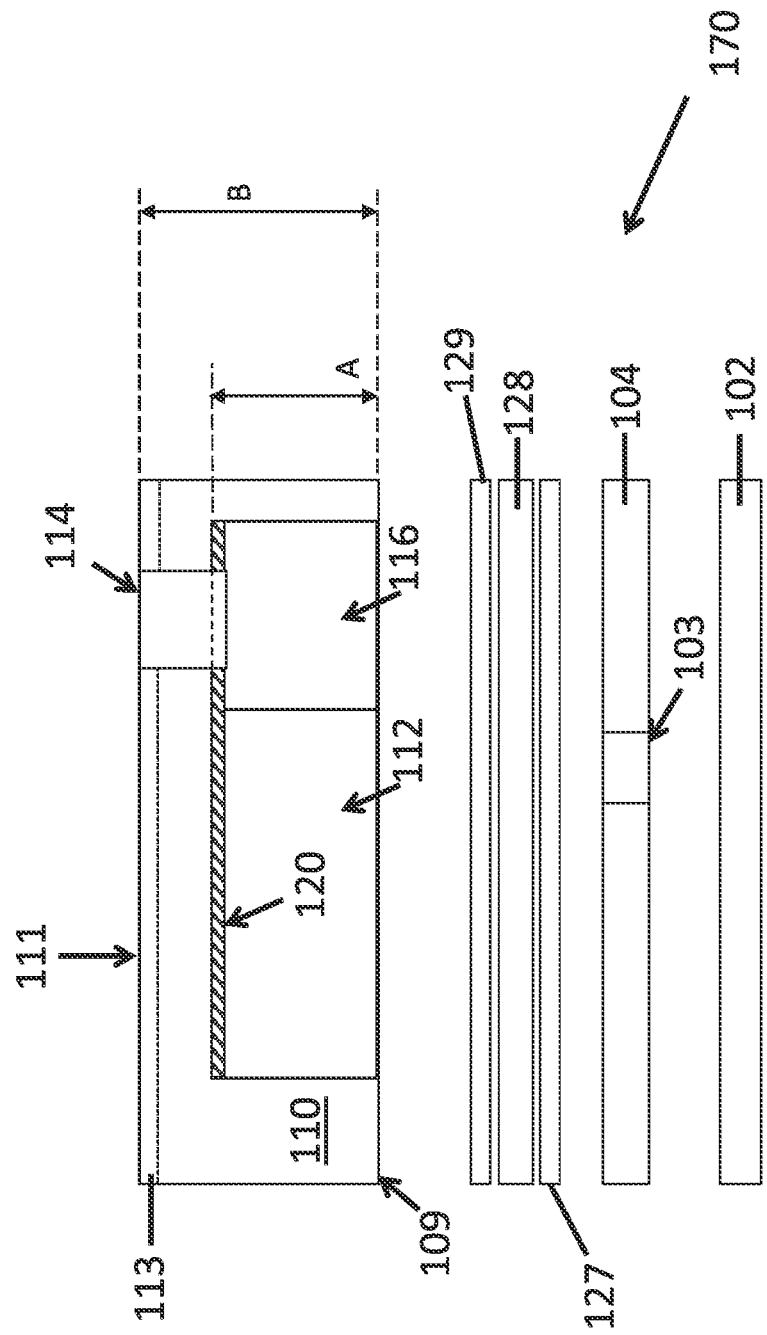
FIG. 1C is a schematic illustration of an exemplary card in accordance with an embodiment of the invention comprising transfer tape.

Another alternate process for assembling a card, such as card 170 illustrated in FIG. 1C, may comprise the use of a transfer tape instead of epoxy or some other resin. Transfer tape comprises an unsupported or supported adhesive 128 with a release layer 127, 129 on both sides. An exemplary process comprises the steps of printing rear sheet (layer 104), such as forward or reverse printed in a roll-to-roll printing step, then rolling on the transfer tape, by removing the release layer 127 from one side, applying the transfer tape to film 104, and leaving the release layer 129 on the opposite side. The printed layer 104 and transfer tape assembly may then be prelaminated. Layer 102 may then be platen laminated to the non-release side of the printed layer 104 and transfer tape assembly. Layer 111 with embedded electronic components (which may be tacked in pocket 112) is then prepared as previously described, without applying epoxy to fill the pocket or to cover the back of layer 111. The release layer 129 is then removed from the 102/104 assembly and the assembly, with transfer tape side facing sheet 111, is applied to sheet 111 with electronic components in the pocket. The assembly may then optionally be further processed, such as by exposing the assembly to mild compression under vacuum to maximize contact of the adhesive with all surfaces and evacuate any air bubbles. Heat may also be applied to reduce viscosity of the adhesive to improve its flowability. Applying heat, vacuum and/or compression may also cause the unsupported adhesive to flow into the pocket to partially or completely fill spaces between the electronics and the boundaries of the pocket.

Figure 1D:
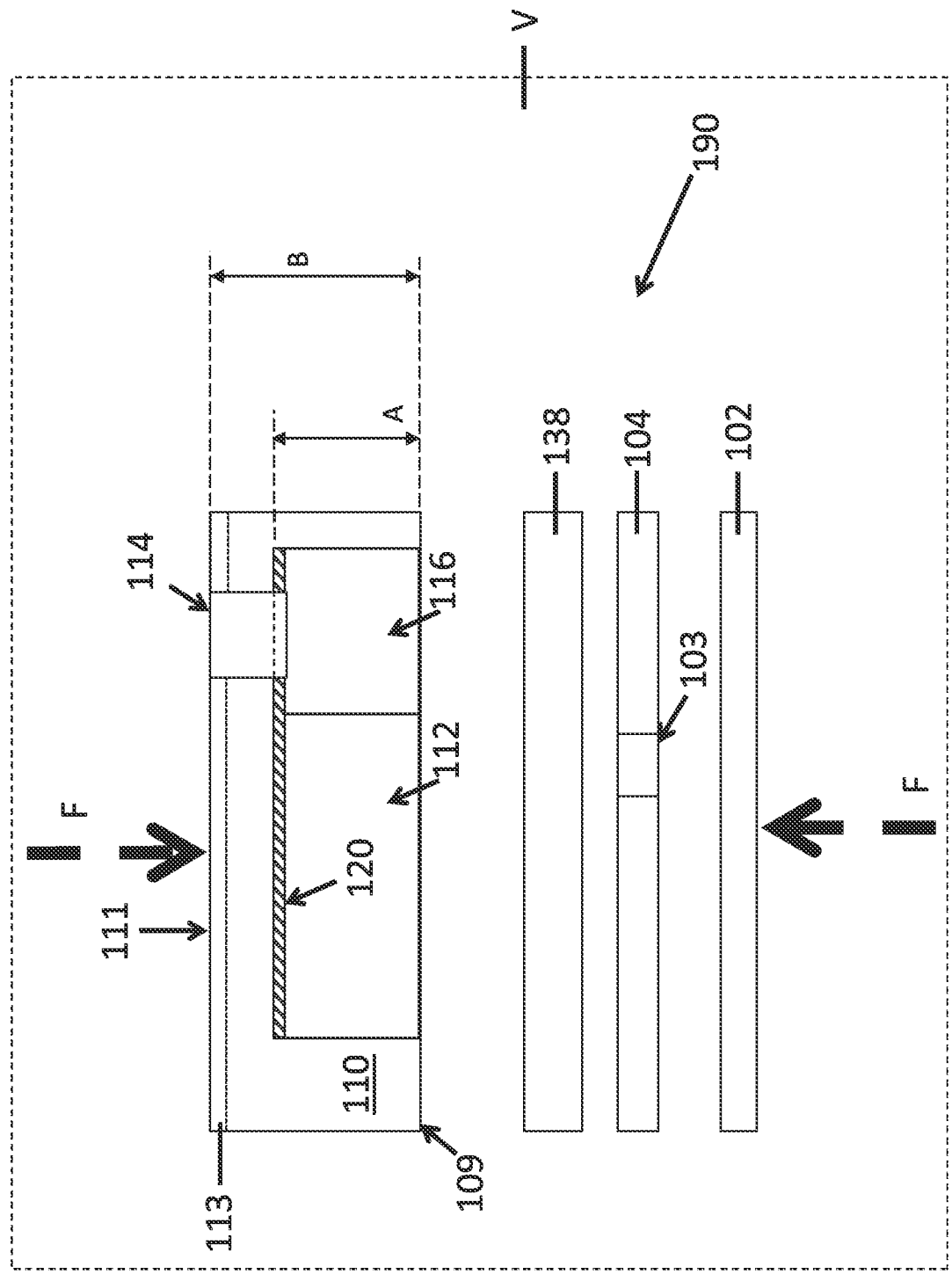
FIG. 1D is a schematic illustration of an exemplary card in accordance with an embodiment of the invention implemented using a hot lamination process.

Still another process for embedding electronics, as shown in FIG. 1D, may comprise a "hot lamination" process, for embedding electronics designed to withstand the amount of heat and pressure present in such a process. In a hot-lam process, layer 111 may be provided with the embedded electronics tacked into the pocket 112 as previously described and the rest of the card 190 is built up with various layers and adhesives and laminated under heat above room temperature, pressure (a compression force F applied to the stack), and/or vacuum (in an environment held at a pressure V less than atmospheric pressure, to facilitate removal of any air trapped between the layers under lamination). Thus, layer 138, shown in FIG. 1D, represents one or more polymer or plastic layers located between layer 104 and the surface 109 of the core, in which at least a closest layer to surface 109 may have a flowable state at a predetermined lamination temperature such that, under the compression force F and/or in a vacuum environment, it will at least partially melt into and at least partially fill pocket 112 during lamination.

Figure 5:
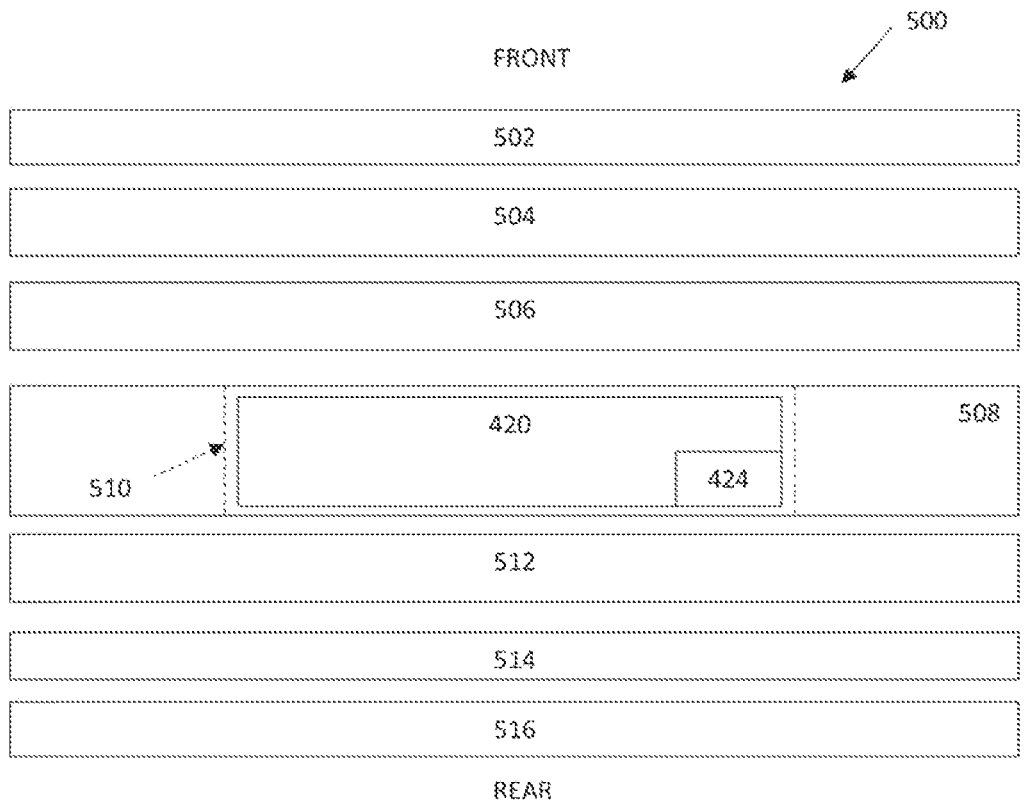
FIG. 5 is a schematic illustration of an exemplary card in accordance with an embodiment of the invention.

FIG. 5 is a schematic illustration of a card 500 in accordance with an exemplary embodiment of the invention. The card 500 generally comprises a plurality of layers, which are shown exploded from one another.

Starting from the front face (i.e., chip side) of the card 500, layer 502 comprises coated PVC, which may be 0.001 inches (0.02 mm) thick, for example. Layer 504 mounted to the bottom side of layer 502 comprises a glass-reinforced epoxy laminate sheet material (e.g., FR4), which may be 0.004 inches (0.1 mm) thick, for example. Layer 506 mounted to the bottom side of the layer 504 comprises adhesive, such as in the form of dual sided high performance adhesive tape, which may be 0.002 inches (0.05 mm) thick, for example. Both sides of the dual sided tape may be covered by a release layer, each of which is removed during the assembly process. A core layer 508 mounted to the bottom side of the layer 506 comprises a non-plastic material such as metal. The metal may be 0.018 inches (0.457 mm) thick steel (such as stainless steel), for example. Layer 508 has a through hole or opening 510, in which 420 (described above) are positioned. Layer 512, mounted to the bottom side of layer 508, comprises a laminating adhesive, which may be 0.002 inches (0.05 mm) thick, for example (and which may be the same material as or different from layer 506). Layer 514 mounted to the bottom side of the layer 512 comprises a polymer, which may be 0.004 inches (0.1 mm) thick, for example. Layer 516 mounted to the bottom side of the layer 514 optionally comprises a PVC overlay, which may be 0.002 inches (0.05 mm) thick, for example (and which may be the same material as or different from layer 502). A magnetic stripe may be mounted on or embedded within layer 516. Layer 516 represents the rear side (i.e., display side) of the card 500. The peripheral dimensions of the various layers of the card 500 are substantially equivalent. The layers shown in FIG. 5 and described above comprise only one exemplary embodiment, and any of them may be optional in other embodiments, which may have fewer than all or additional layers than those described above. Thicknesses noted above are for example only. Cards corresponding to the present invention are not limited to any particular layers, material compositions, or thicknesses of such layers, although certain claimed embodiments and combinations may have distinct advantages.

The arrangement of the various layers can vary. For example, the layers 502, 504 and 506 of the card 500 may be replaced by a second set of layers 516, 514 and 512. Such a card is useful for electronics 420 that can handle a hot lamination process, as is discussed later. As another example, the layers 502 and 516 may be switched so that the layer 502 is on the rear side of the card 500 and the layer 516 is on the front side of the card 500.

The layers 512, 514 and 516 are (optionally) transparent so that the display 424 of the electronic components 420 is visible from the rear side of the card. The display 424 may be, for example, a single indicator LED light or a display that is capable of displaying alphanumeric characters, as described above. In another embodiment, layers 502, 504, 506 are (optionally) transparent so that the display 424 of the electronic components 420 is visible from the front side of the card. Alternatively, all of the layers 502, 504, 506, 512, 514 and 516 are (optionally) transparent so that the display 424 of the electronic components 420 is visible from both sides of the card.

Figure 6:
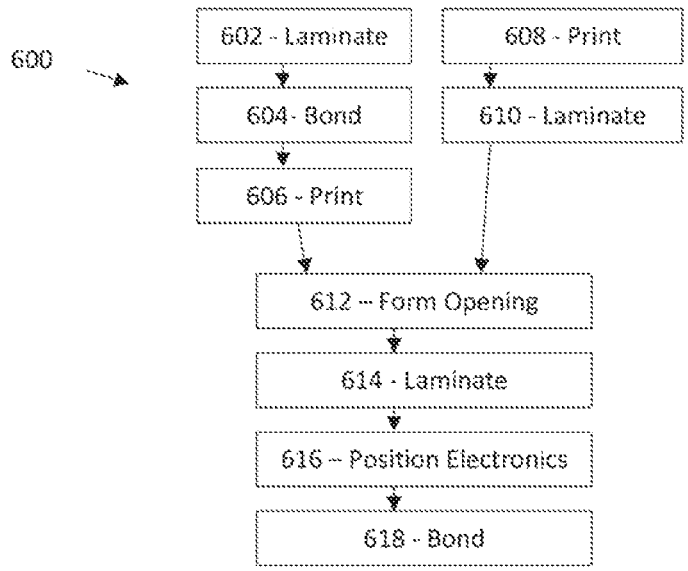
FIG. 6 is a block diagram depicting an exemplary method for assembling the card of FIG. 5.

FIG. 6 is a block diagram depicting an exemplary method 600 for assembling the card 500 of FIG. 5. The method 600 is not necessarily limited to any particular step or sequence of steps.

In exemplary method 600, at step 602, layer 502 is laminated to layer 504. Lamination at step 602 may be hot lamination involving heat and pressure. At step 604, the laminated layers 502 and 504 are bonded to the top surface of the two sided tape layer 506 (i.e., after the top release sheet is removed from layer 506). At optional step 606, text and graphics may be printed on layer 502. At optional step 608, text and graphics may be printed on layer 514. Step 608 may be completed before step 602 or vice versa. At step 610, layer 514 is laminated to layer 516. Lamination at step 610 may comprise hot lamination involving heat and pressure. As an alternative to step 610, layer 514 may be laminated to layer 516 and layer 508 in a single step using the laminating adhesive of layer 512. At step 612, the opening 510 is formed in the layer 508. At step 614, the layers 514 and 516 are laminated to the bottom side of layer 508 using layer 512. Lamination at step 614 may comprise hot lamination involving heat and pressure. At step 616, the electronic components 420 are positioned within the opening 510 that is formed in the layer 508.

At step 618, the bonded layers 502, 504 and 506 are bonded to the top side of the layer 508 using the lower surface of the two sided tape layer 506 (i.e., after the bottom release sheet is removed from layer 506). Step 618 may preferably be a cold lamination step in which no significant heat or pressure is required; however, vacuum may be used. The method 600 preferably uses a cold lamination process at step 618 to avoid exposing the electronics 420 to heat and/or pressure.

For electronics that can tolerate the hot lamination process, the layers 502, 504 and 506 of the card 500 may be replaced by layers 516, 514 and 512, as noted above. To assemble such a card, the electronics 420 are first placed in opening 510; a first set of layers 516, 514 and 512 is hot laminated to one side of the layer 508; and, a second set of layers 516, 514 and 512 is then hot laminated to the other side of the layer 508.

Figure 7:
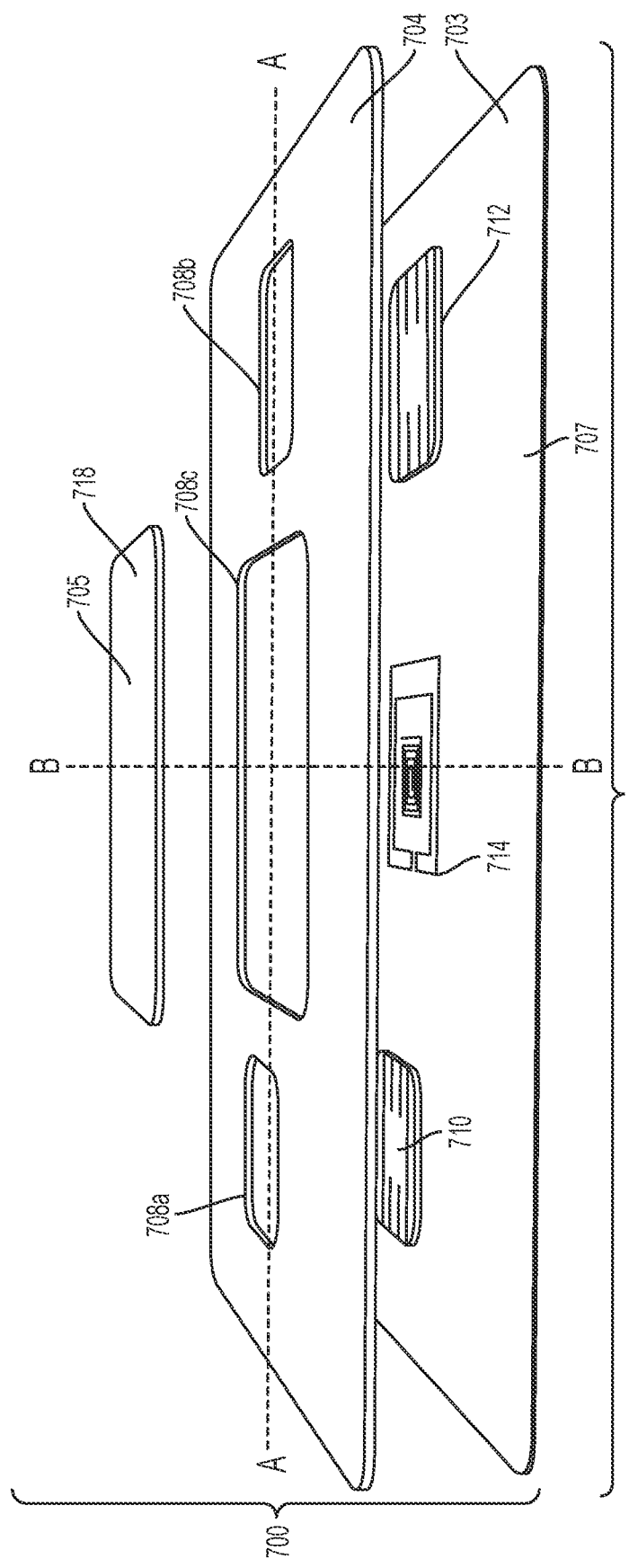
FIG. 7 depicts a schematic illustration of an exemplary card in accordance with another embodiment of the invention.

FIG. 7 depicts an exploded view of a card 700 according to another exemplary embodiment. Card 700 comprises a plurality of layers, and may include additional layers other than those depicted herein. The layers have approximately the same maximum outer dimensions along the axes A and B. Layer 702 comprises a metal core, such as comprising stainless steel, having a front surface 704 and a rear surface 706. The thickness of the layer 702 may be 0.018 inches (0.45 mm), for example. Layer 702 may have a coating on the front surface 704 for supporting printing thereon.

Layer 702 has three thru-openings 708a, 708b and 708c, each of which extends from the front surface 704 to the rear surface 706. Opening 708c is positioned in the approximate center of the card and is substantially aligned along the lengthwise axis 'A' and widthwise axis 'B.' The openings 708a and 708b flank each side of the opening 708c. Each opening 708a, 708b and 708c has a substantially rectangular or square shape with rounded interior corners. The opening 708c is larger than the openings 708a and 708b. The size and shape of the openings may vary from that which is shown and described. The openings may be provided in the form of pockets or blind holes, if so desired.

Layer 703 is positioned beneath layer 702. Layer 703 is a printed circuit board (PCB) composed of FR4 material having a thickness of 0.004 inches (0.1 mm), for example. The layer 703 may be composed of, generally, glass reinforced epoxy laminate sheet material. Although not shown, layer 703 includes a plurality of traces, which may be composed of copper, for example, that are capable of transmitting electrical signals and current.

A payment module, in the form of chip 710, is mounted to the top side of the layer 703 and extends thereabove. The chip 710 may form part of a dual interface (DI) system, as was described above. In an assembled form of the card 700, the chip 710 is positioned to be contained within the opening 708a.

A fingerprint pad 712 is also mounted to the top side 707 of the layer 703 and extends thereabove. The fingerprint pad 712 connects to the chip 710 by vias and/or traces (not shown) in the layer 703. In an assembled form of the card 700, the fingerprint pad 712 is positioned to be contained within the opening 708b.

A capacitive RF antenna 714 is mounted to the top side 707 of the layer 703 or embedded within the layer 703. The antenna 714 is positioned at the approximate center of the card 700 in an effort to conform to one or more compliance standards. The antenna 714 connects to the chip 710 by vias and/or traces (not shown) in the layer 703. In an assembled form of the card 700, the antenna 714 is positioned along axes A and B to be aligned with the opening 708c. The antenna 714 may or may not protrude above the surface of the layer 703. The antenna 714 consumes a large area on the layer 703 in an effort to enhance wireless performance.

An insert 705 is positioned within the opening 708c of the layer 702 and resides above the antenna 714 on the layer 703. The insert 705 may be composed of plastic having a thickness of 0.018 inches (0.45 mm), for example. The thickness of the insert 705 may be equal to the thickness of the layer 704. The front surface 718 of the insert 705 may have a coating for supporting printing thereon along with the front surface of the layer 702. Alternatively, one or more plastic layers (not shown) may be applied over the insert 705 and the layer 702, and the printing may be applied to the outermost layer. The plastic insert 705 is configured to permit RF flux emitted by the antenna 714.

Although not shown, a small integrated circuit (IC) may also be mounted to the top of side of the layer 703 (or within the layer 703) for processing signals transmitted between the fingerprint pad 712 and the chip 710. More particularly, the IC can verify fingerprints applied to the pad 712. The IC may be connected to other components mounted to the layer 703, and traces and/or vias can connect the IC chip to the other components of the card 700. The components mounted to the layer 703 may vary from that which is shown and described. The components may include an IC, a Bluetooth module, a display, and so forth.

Although an exemplary embodiment is described herein as having a metal core, it should be understood that similar constructions and manufacturing processes may be relevant to the creation of cards with non-plastic core other than metal, such as a ceramic core. A card with a ceramic core has the advantage of not requiring an EMI shielding layer, such as the ferrite layer described herein, or any of the process steps relating to placement or creation of the EMI shielding layer. The ceramic core may be made with any number of pockets and holes as required to house the electronics via molding, machining, etching, or any method known in the art for creating such features in ceramic bodies. Methods for making a ceramic core are described in U.S. application Ser. No. 15/521,519, titled "CERAMIC-CONTAINING AND CERAMIC COMPOSITE TRANSACTION CARDS," assigned to the common applicant of this application, and incorporated herein by reference. Although described with certain layers herein, any portions of the card may have fewer, more, or different layers than those described herein, and each of the layers may have different materials of constructions than those discussed herein. The invention is not limited to any particular order of the layers or sequence of assembling them. Certain layers as described herein may comprise composites of more than one material or layer of material. Additional layers may be disposed between any of the layers as disclosed herein, either as part of the finished card, or as temporary layers (e.g. release layers) that are removed during the assembly process. Layers disclosed herein as discrete films may instead be provided as coatings, and vice versa.

Aspects of the Present Invention

Various illustrative aspects of the present invention may be summarized as follows:

Aspect 1: A transaction card comprising:

a non-plastic core having first and second faces and a core thickness therebetween, and an opening in the first face;

embedded electronics disposed in the opening, the embedded electronics comprising at least a printed circuit board and an active or passive power source;

a fill layer in contact with the embedded electronics, disposed in portions of the opening not occupied by the embedded electronics;

one or more layers disposed over the fill layer.

Aspect 2: The transaction card of aspect 1, wherein the one or more layers comprises a polymer layer and a magnetic stripe.

Aspect 3: The transaction card of aspect 1, wherein the one or more layers comprises a laser reactive layer.

Aspect 4: The transaction card of aspect 1, wherein the embedded electronics further comprise a display and a processor configured to generate a dynamic security code on the display.

Aspect 5: The transaction card of aspect 1, wherein the core further comprises a pocket extending from the opening and having a pocket bottom with a depth less than the core thickness, a through-hole that connects the second face to the bottom of the pocket, contacts disposed in the through-hole configured to be read by a card reader, and an integrated circuit module connected to the contacts.

Aspect 6: The transaction card of aspect 1, wherein the core has a coating on the second face and printed indicia on the coating.

Aspect 7: The transaction card of aspect 1, further comprising indicia formed on at least one of the one or more layers disposed over the fill layer.

Aspect 8: The transaction card of aspect 7, wherein the indicia comprises printed indicia, laser formed indicia, or a combination thereof.

Aspect 9: The transaction card of aspect 1, wherein the non-plastic core comprises metal, and the non-plastic core further comprises a pocket extending from the opening which has a pocket bottom with a depth less than the core thickness, and the card further comprises an EMI shielding layer disposed in the void between the embedded electronics and the pocket bottom.

Aspect 10: The transaction card of aspect 9, wherein the EMI shielding layer comprises ferrite.

Aspect 11: The transaction card of aspect 1, wherein the non-plastic core comprises ceramic.

Aspect 12: The transaction card of aspect 1, wherein the fill layer comprises a cured resin.

Aspect 13: The transaction card of aspect 1, wherein the fill layer is confined to the opening.

Aspect 14: The transaction card of aspect 1, wherein the fill layer extends across the first face of the non-plastic core.

Aspect 15: The transaction card of aspect 1, wherein the fill layer comprises a transfer tape adhesive.

Aspect 16: The transaction card of aspect 1, wherein the fill layer comprises a polymer having a flowable state at a predetermined lamination temperature.

Aspect 17: A process for making a transaction card defined by a plurality of layers, the process comprising the steps of:

providing a first portion of the card, the first portion comprising a non-plastic core having first and second faces and a core thickness therebetween;

forming an opening in the core, the opening defined through the first face;

disposing embedded electronics, comprising at least a printed circuit board and a battery, in the opening;

providing a second portion of the card;

providing a fill disposed in portions of the opening not occupied by the embedded electronics and attaching the first portion of the card to the second portion of the card.

Aspect 18: The process of aspect 17, wherein the steps of providing the fill and attaching the first portion to the second portion of the card comprises the substeps of:

applying a first component of a resin to the first portion of the card in contact with the first face and the embedded electronics;

applying a second component of the resin in contact with the second portion of the card;

assembling the first component and the second component together with the first component of the resin and the second component of the resin in contact with one another;

curing the resin.

Aspect 19: The process of aspect 17, wherein the resin comprises a two part epoxy in which the first component of the resin is different from the second component of the resin.

Aspect 20: The process of aspect 17, wherein the step of curing the resin comprises curing the resin by ultraviolet light, humidity or heating.

Aspect 21: The process of aspect 17, wherein the step of curing the resin comprises curing the resin in a vacuum press.

Aspect 22: The process of aspect 17, wherein the steps of providing the fill and attaching the first portion to the second portions of the card comprises the substeps of:

providing a transfer tape comprising unsupported adhesive disposed between a first release layer and a second release layer;

removing the first release layer and attaching the adhesive to one of (i) the second portion of the card, and (ii) the first face and the embedded electronics; and removing the second release layer and attaching the adhesive to the other of (i) the second portion of the card, and (ii) the first face and the embedded electronics.

Aspect 23: The process of aspect 17, wherein the steps of providing the fill and attaching the first portion to the second portions of the card comprises the substeps of:

laminating the first portion to the second portion in a lamination process at a temperature above room temperature, wherein the fill comprises a portion of a flowable polymer layer disposed in the second portion, wherein the flowable polymer layer is flowable at the lamination temperature.

Aspect 24: The process of aspect 17, wherein the steps of providing the fill and attaching the first portion to the second portions of the card comprises the substeps of:

applying a resin at least in a portion of the opening, wherein the resin does not extend beyond the opening; and curing the resin.

Aspect 25: The process of aspect 24, further comprising laminating at least one sheet over the resin and the first portion of the card.

Aspect 26: The process of aspect 17, further comprising tacking the electronics in the opening before disposing the fill in the opening.

Aspect 27: The process of aspect 17, wherein the core comprises a coating on the second face, further comprising applying printed indicia to the coating.

Aspect 28: The process of aspect 17, wherein the second portion comprises a plurality of layers.

Aspect 29: The process of aspect 28, wherein the plurality of layers comprises a polymer layer, a magnetic stripe and a laser reactive layer.

Aspect 30: The process of aspect 17, further comprising forming indicia on the second portion.

Aspect 31: The process of aspect 30, wherein the step of forming the indicia comprises printing the indicia.

Aspect 32: The process of aspect 31, wherein the plurality of layers of the second portion comprises a clear polymer layer, comprising printing the indicia on the clear polymer layer.

Aspect 33: The process of aspect 31, wherein the plurality of layers of the second portion comprises a laser reactive layer and the step of forming the indicia comprises exposing the laser reactive layer to a laser.

Aspect 34: The process of aspect 29, wherein the step of providing the second portion comprises pre-laminating the plurality of layers together prior to applying the resin.

Aspect 35: The process of aspect 34, wherein the plurality of layers of the second portion comprise a carrier substrate having one adhesive side and one non-adhesive side, a clear polymer layer, a magnetic stripe, and a laser reactive layer, the step of pre-laminating the second portion comprising contacting the adhesive side of the carrier substrate to one side of the clear polymer layer and laminating the laser reactive layer to the clear polymer layer.

Aspect 36: The process of aspect 34, wherein the forming step comprises forming a pocket extending from the opening and having a pocket bottom with a depth less than the core thickness.

Aspect 37: The process of aspect 36, wherein the core comprises metal, and the process further comprises disposing a layer of ferrite between the embedded electronics and the pocket bottom.

Aspect 38: The process of aspect 17, wherein the core comprises metal, and the process further comprises disposing a coating over a surface of the metal that enables printing on the coated metal surface.

Aspect 39: The process of aspect 17, wherein the core comprises ceramic.

Aspect 40: The process of aspect 17, further comprising forming a through-hole in the core, disposing contacts in the through-hole, and electrically connecting the contacts to an integrated circuit module.

Aspect 41: The process of aspect 40, wherein the process of forming the through-hole is performed prior to the step of assembling the first component and the second component together.

Aspect 42: The process of aspect 17, wherein the transaction card has a first area defined by a first length and a first width, and the process comprises assembling the plurality of layers that define the card as a composite comprising a plurality of sheets, each sheet defining one of the plurality of layers and having a second area larger than the first area by a factor greater than two, wherein the process further comprises cutting the transaction card and one or more other transaction cards from the composite.

Aspect 43: The process of aspect 42, further comprising personalizing each card after cutting the card from the composite.

Aspect 44: The process of aspect 17, wherein the steps of providing the fill and attaching the first portion to the second portion of the card comprises the substeps of:

applying a first resin in the opening of the card and over the embedded electronics;

curing the first resin;

applying a first component of a second resin to the first portion of the card in contact with the first face and the embedded electronics;

applying a second component of the second resin in contact with the second portion of the card;

assembling the first component and the second component together with the first component of the second resin and the second component of the second resin in contact with one another; and curing the second resin.

Aspect 45: A transaction card comprising:

a non-plastic core having first and second faces, a core thickness therebetween, and an opening;

embedded electronics disposed in the opening; and one or more layers disposed over the non-plastic core and the embedded electronics.

Aspect 46: The transaction card of aspect 45 further comprising a dual interface (DI) chip either mounted or embedded in the non-plastic core.

Aspect 47: The transaction card of aspect 45, wherein the one or more layers comprises a layer of glass or fiber reinforced epoxy laminate sheet material.

Aspect 48: The transaction card of aspect 45, wherein the non-plastic core comprises metal.

Aspect 49: The transaction card of aspect 45, further comprising adhesive mounted between the core layer and the one or more layers.

Aspect 50: The transaction card of aspect 49, wherein the adhesive is a laminating adhesive.

Aspect 51: The transaction card of aspect 45, further comprising a magnetic stripe either mounted on or embedded within one of the one or more layers.

Aspect 52: The transaction card of aspect 45, wherein one or more layers are mounted to the first face of the non-plastic core, and one or more layers are mounted to the second face of the non-plastic core.

Aspect 53: The transaction card of aspect 45, wherein the embedded electronics comprise either a display or an indicator, and the one or more layers are transparent, such that the display or indicator is visible from an exterior of the transaction card.

Aspect 54: A process for making a transaction card defined by a plurality of layers, the process comprising the steps of:

forming an opening in a non-plastic core layer having first and second faces and a core thickness therebetween in the core;

disposing embedded electronics at least partially in the opening; and disposing one or more layers over the non-plastic core layer and the embedded electronics.

Aspect 55: The process of aspect 54 further comprising the step of mounting a dual interface (DI) chip to the non-plastic core.

Aspect 56: The process of aspect 54, wherein the step of disposing one or more layers over the non-plastic core layer comprises disposing one or more layers over each face of the non-plastic core layer.

Aspect 57: The process of aspect 54 further comprising the step of hot laminating one of the one or more layers to the first face of the card using heat, pressure or both heat and pressure.

Aspect 58: The process of aspect 57, wherein the step of disposing embedded electronics in the opening of the non-plastic core layer is performed after the step of laminating.

Aspect 59: The process of aspect 58 further comprising the step of cold laminating one of the one or more layers to the second face of the card, wherein the cold laminating step is performed after the step of disposing embedded electronics in the opening of the non-plastic core layer.

Aspect 60: The process of aspect 59, wherein the cold laminating step comprises vacuum, adhesive or both vacuum and adhesive.

Aspect 61: The process of aspect 54, wherein the embedded electronics comprise either a display or an indicator, and the one or more layers are transparent, such that the display or indicator is visible from an exterior of the transaction card.

Aspect 62: A transaction card comprising:

a non-plastic core having first and second faces, a core thickness therebetween, and an opening;

a printed circuit board having an antenna that is substantially aligned with the opening in the non-plastic core; and an insert disposed in the opening and positioned over the antenna.

Aspect 63: The transaction card of aspect 62, wherein the insert is composed of plastic.

Aspect 64: The transaction card of aspect 62, wherein the non-plastic core is composed of a polymer, a metal or a ceramic.

Aspect 65: The transaction card of aspect 62 further comprising additional components on the printed circuit board and additional openings in the non-plastic core, wherein the additional components are respectively either positioned in or aligned with the additional openings.

Aspect 66: The transaction card of aspect 62, wherein maximum outer lengthwise and widthwise dimensions of the non-plastic core and the printed circuit board are substantially equal.

Although the invention is illustrated and described herein with reference to specific embodiments, the invention is not intended to be limited to the details shown, Rather, various modifications may be made in the details within the scope and range of equivalents of the claims and without departing from the invention.

What is claimed:

1. A process for making a transaction card defined by a plurality of layers, the process comprising the steps of:

providing a first portion of the card, the first portion comprising a non-plastic layer having first and second faces and a thickness therebetween;

forming an opening in the non-plastic layer, the opening defined through the first face;

disposing embedded electronics in the opening;

providing a second portion of the card;

providing a fill disposed in portions of the opening not occupied by the embedded electronics and attaching the first portion of the card to the second portion of the card; and wherein the step of providing the fill and attaching the first portion to the second portion of the card comprises the substeps of:

providing a transfer tape comprising unsupported adhesive disposed between a first release layer and a second release layer;

removing the first release layer and attaching the adhesive to one of (i) the second portion of the card, and (ii) the first face and the embedded electronics; and removing the second release layer and attaching the adhesive to the other of (i) the second portion of the card, and (ii) the first face and the embedded electronics.

2. The process of claim 1, further comprising tacking the electronics in the opening before disposing the fill in the opening.

3. The process of claim 1, wherein the non-plastic layer comprises a coating on the second face, further comprising applying printed indicia to the coating.

4. The process of claim 1, wherein the second portion comprises a plurality of layers.

5. The process of claim 4, wherein the plurality of layers comprises a polymer layer, a magnetic stripe and a laser reactive layer.

6. The process of claim 1, further comprising forming indicia on the second portion.

7. The process of claim 6, wherein the step of forming the indicia comprises printing the indicia.

8. The process of claim 7, wherein the second portion comprises a clear polymer layer, comprising printing the indicia on the clear polymer layer.

9. The process of claim 6, wherein the second portion comprises a laser reactive layer and the step of forming the indicia comprises exposing the laser reactive layer to a laser.

10. The process of claim 1, wherein the non-plastic layer comprises metal, and the process further comprises disposing a coating over a surface of the metal that enables printing on the coated metal surface.

11. The process of claim 1, wherein the non-plastic layer comprises ceramic.

12. The process of claim 1, wherein the transaction card has a first area defined by a first length and a first width, and the process comprises assembling the plurality of layers that define the card as a composite comprising a plurality of sheets, each sheet defining one of the plurality of layers and having a second area larger than the first area by a factor greater than two, wherein the process further comprises cutting the transaction card and one or more other transaction cards from the composite.

13. The process of claim 12, further comprising personalizing each card after cutting the card from the composite.

14. The process of claim 1, further comprising forming a pocket extending from the opening and having a pocket bottom with a depth less than the thickness.

15. The process of claim 1, wherein the embedded electronics comprises at least a printed circuit board and a battery.

16. A process for making a transaction card defined by a plurality of layers, the process comprising the steps of:
providing a first portion of the card, the first portion comprising a non-plastic layer having first and second faces and a thickness therebetween;
forming an opening in the non-plastic layer, the opening defined through the first face;
disposing embedded electronics in the opening;
providing a second portion of the card;
providing a fill disposed in portions of the opening not occupied by the embedded electronics and attaching the first portion of the card to the second portion of the card; and
wherein the step of providing the fill and attaching the first portion to the second portion of the card comprises the substeps of:
laminating the first portion to the second portion in a lamination process at a temperature above room temperature, wherein the fill comprises a portion of a flowable polymer layer disposed in the second portion, wherein the flowable polymer layer is flowable at the lamination temperature.

17. The process of claim 16, further comprising tacking the electronics in the opening before disposing the fill in the opening.

18. The process of claim 16, wherein the non-plastic layer comprises a coating on the second face, further comprising applying printed indicia to the coating.

19. The process of claim 16, wherein the second portion comprises a plurality of layers.

20. The process of claim 19, wherein the plurality of layers comprises a polymer layer, a magnetic stripe and a laser reactive layer.

21. The process of claim 16, further comprising forming indicia on the second portion.

22. The process of claim 21, wherein the step of forming the indicia comprises printing the indicia.

23. The process of claim 22, wherein a plurality of layers of the second portion comprises a clear polymer layer, comprising printing the indicia on the clear polymer layer.

24. The process of claim 21, wherein the second portion comprises a laser reactive layer and the step of forming the indicia comprises exposing the laser reactive layer to a laser.

25. The process of claim 16, wherein the non-plastic layer comprises metal, and the process further comprises disposing a coating over a surface of the metal that enables printing on the coated metal surface.

26. The process of claim 16, wherein the non-plastic layer comprises ceramic.

27. The process of claim 16, wherein the transaction card has a first area defined by a first length and a first width, and the process comprises assembling the plurality of layers that define the card as a composite comprising a plurality of sheets, each sheet defining one of the plurality of layers and having a second area larger than the first area by a factor greater than two, wherein the process further comprises cutting the transaction card and one or more other transaction cards from the composite.

28. The process of claim 16, further comprising personalizing each card after cutting the card from the composite.

29. The process of claim 16, further comprising forming a pocket extending from the opening and having a pocket bottom with a depth less than the thickness.

30. The process of claim 16, wherein the embedded electronics comprises at least a printed circuit board and a battery.

* * * * *